(12) United States Patent
Pierce et al.

(10) Patent No.: US 9,321,352 B2
(45) Date of Patent: Apr. 26, 2016

(54) SOLAR AUXILIARY POWER SYSTEMS FOR VEHICLES

(71) Applicant: Arpin Renewable Energy, LLC, Warwick, RI (US)

(72) Inventors: Philip R. Pierce, South Yarmouth, MA (US); Peter Arpin, Warwick, RI (US); Norman Cook, Narragansett, RI (US); Jay Johnson, Thompson, CT (US); Jeffrey C. Flath, Warwick, RI (US); Gary T. Wenger, Harvard, MA (US)

(73) Assignee: Arpin Renewable Energy, LLC, Warwick, RI (US)

( * ) Notice: Subject to any disclaimer, the term of this patent is extended or adjusted under 35 U.S.C. 154(b) by 540 days.

(21) Appl. No.: 13/694,040

(22) Filed: Apr. 1, 2013

(65) Prior Publication Data
US 2014/0116077 A1 May 1, 2014

Related U.S. Application Data

(60) Provisional application No. 61/628,005, filed on Oct. 24, 2011.

(51) Int. Cl.
*B60L 1/02* (2006.01)
*B60H 1/00* (2006.01)
*F25B 27/00* (2006.01)
*B60L 7/10* (2006.01)
*B60L 8/00* (2006.01)

(52) U.S. Cl.
CPC .............. *B60L 1/02* (2013.01); *B60H 1/00364* (2013.01); *B60L 7/10* (2013.01); *B60L 8/003* (2013.01); *F25B 27/002* (2013.01); *Y02T 10/7083* (2013.01)

(58) Field of Classification Search
CPC ............ B60L 1/02; B60L 7/10; B60L 8/003; B60H 1/00364; F25B 27/002; Y02T 10/7083
See application file for complete search history.

(56) References Cited

U.S. PATENT DOCUMENTS

| 4,780,618 | A | 10/1988 | Wareman et al. |
| 5,333,678 | A | 8/1994 | Mellum et al. |
| 6,812,582 | B2 | 11/2004 | Kennedy |
| 7,151,326 | B2 | 12/2006 | Jordan |
| 7,316,119 | B2 | 1/2008 | Allen |
| 7,338,335 | B1 * | 3/2008 | Messano ................ B60G 13/14 180/65.22 |
| 2004/0231831 | A1 | 11/2004 | Houck et al. |
| 2007/0170886 | A1 * | 7/2007 | Plishner .................... B60L 8/00 320/104 |
| 2007/0221370 | A1 | 9/2007 | Allen |
| 2007/0284023 | A1 * | 12/2007 | Sitarz ....................... B60J 11/00 150/166 |

(Continued)

FOREIGN PATENT DOCUMENTS

| CN | 201604567 | | 10/2010 | |
| DE | 10 2007 020 815 | * | 5/2007 | ............... B60S 1/00 |

(Continued)

*Primary Examiner* — Zeev V Kitov
(74) *Attorney, Agent, or Firm* — Michael de Angeli

(57) ABSTRACT

An integrated truck and trailer power system comprises auxiliary power generation and storage devices mounted on a trailer, such as an array of solar panels mounted on the roof of the trailer and a storage battery mounted on the trailer, and switching devices for controlling flow of power there between and to an electrically powered HVAC system of the truck, whereby the truck can be maintained at a comfortable temperature by supply of power stored by the auxiliary power storage device.

13 Claims, 2 Drawing Sheets

(56) References Cited

U.S. PATENT DOCUMENTS

| | | |
|---|---|---|
| 2008/0174174 A1 | 7/2008 | Burns et al. |
| 2008/0258497 A1* | 10/2008 | Oliver .................. B60R 15/00 296/168 |
| 2009/0260377 A1 | 10/2009 | Miller et al. |
| 2010/0147821 A1 | 6/2010 | Kaesler et al. |
| 2010/0175736 A1 | 7/2010 | Reichart et al. |
| 2010/0212659 A1 | 8/2010 | Carpoff |
| 2010/0263703 A1 | 10/2010 | Reichart et al. |

FOREIGN PATENT DOCUMENTS

| | | |
|---|---|---|
| IT | 1151980 | 7/1982 |
| WO | WO 2009/089160 | 7/2009 |
| WO | WO 2010/094875 | 8/2010 |

* cited by examiner

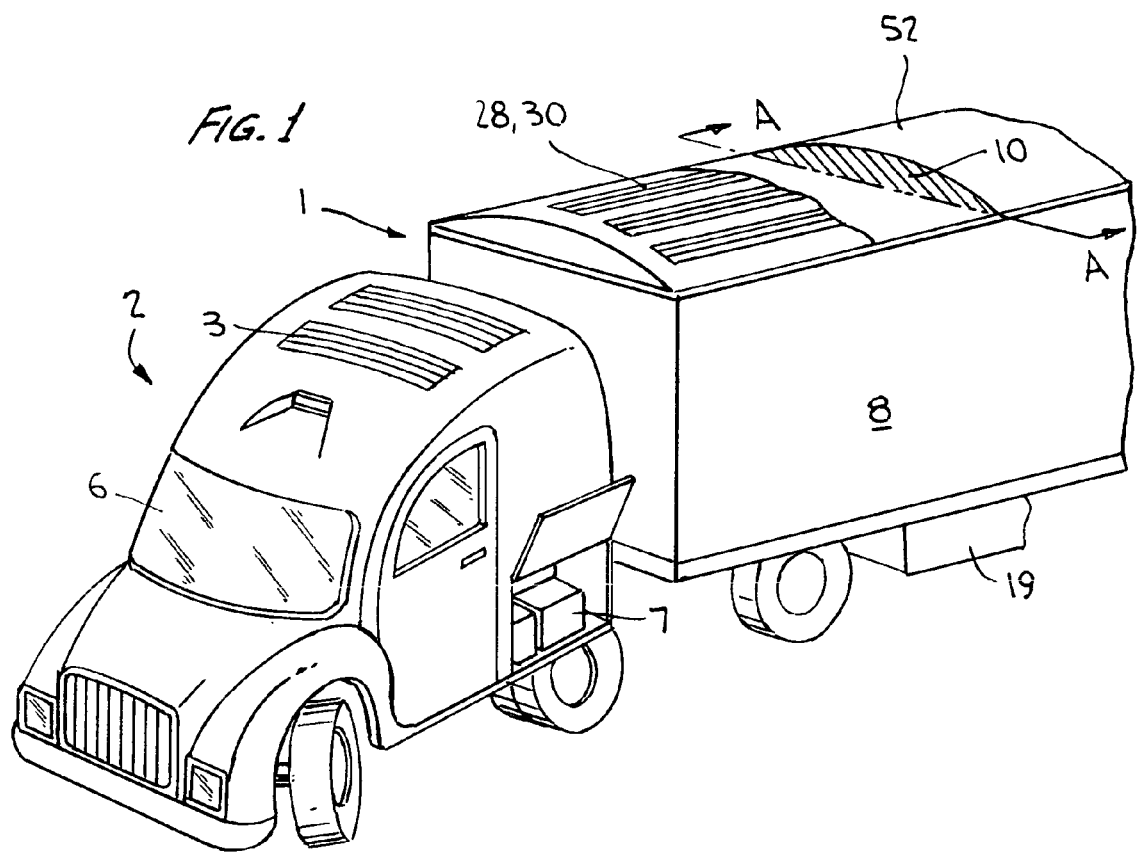
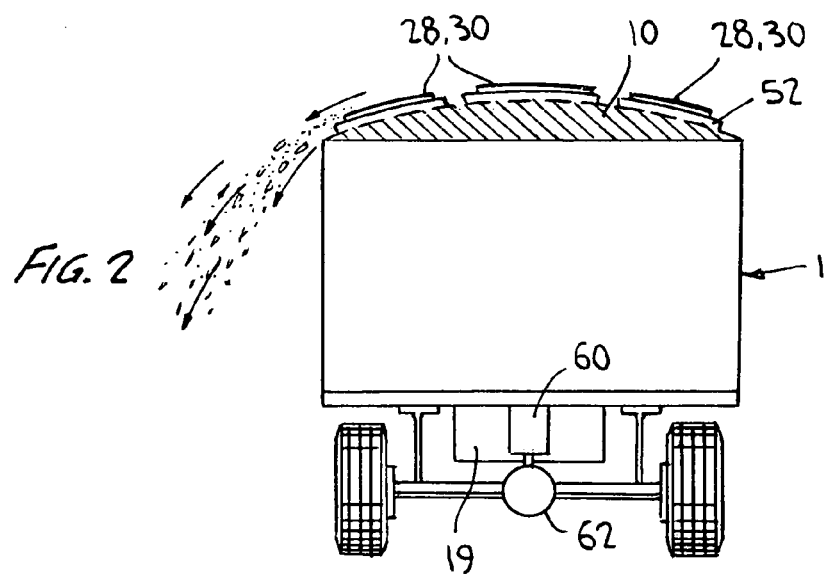

SOLAR AUXILIARY POWER SYSTEMS FOR VEHICLES

CROSS-REFERENCE TO RELATED APPLICATION

This application claims priority from provisional application Ser. No. 61/628,005, filed Oct. 24, 2011.

FIELD OF THE INVENTION

This invention relates to improvements in vehicle power systems. The invention is described as implemented as an auxiliary power system for a truck and trailer combination, but is useful in connection with other vehicles, such as buses, emergency vehicles, and others. In the truck and trailer embodiment, a trailer carries an auxiliary power source and power storage device, which can be used to power truck loads such as heating and air conditioning units while the truck engine is not running, and to power additional loads on the trailer, such as signage and refrigeration units. The invention also includes a novel deicing system for vehicle roofs.

BACKGROUND OF THE INVENTION

Recent regulatory actions have made it important to alter practices in the trucking and related industries. Specifically, it had been the practice for years for truck drivers to allow their engines to idle for many hours, often all night, so as to provide either heat or air conditioning to the cab, for comfortable sleeping. This has now been disallowed, necessitating some other means of providing temperature control for the cab. Some truck stops provide plug-in "shore power" for powering electrically-operated heating and air conditioning equipment, but this is not always convenient, and is expensive where possible. It would therefore be desirable to provide some way to control the cab temperature during extended layover periods that did not necessitate running the truck's engine, or connection to a "shore power" outlet.

Another new practice is necessitated by regulations mandating that truck and trailer roofs be cleared of snow and ice before driving. While it is obviously desirable to do so for reasons of safety, manual snow and ice removal can be quite burdensome and dangerous for the drivers. It would therefore be desirable to provide a way to keep the truck and trailer roofs free of snow and ice buildup, especially while stopped for the night, and which again does not involve running the truck engine or connection to an external power supply of some kind.

It would also be desirable to provide power to the truck cab to supply electrical "comfort loads", such as communication and entertainment systems for the driver, in a manner which would not require the truck engine to run, not require power to be drawn from the truck's battery, nor to require a "shore power" connection.

The following summarizes the pertinent art known to the inventors:

Chinese patent CN201604567 shows a solar-powered refrigerated trailer, with energy storage capacity provided by batteries.

Italian patent IT1151980 shows powering loads such as lights, air conditioning and the like from a separate battery charged by solar cells mounted on the tractor or trailer.

U.S. Pat. No. 4,780,618 to Wareman et al shows powering certain tractor components from an engine of a refrigeration unit comprised by a trailer while the tractor engine is shut off.

U.S. Pat. No. 5,333,678 to Mellum et al shows an auxiliary power unit for a tractor that supplies HVAC capability and keeps the main engine warm when shut off.

U.S. Pat. No. 6,812,582 to Kennedy shows driving the air conditioning compressor of a tractor with an electric motor, itself powered by a diesel generator.

U.S. Pat. No. 7,151,326 to Jordan shows providing an auxiliary power unit on a trailer for supplying power to a tractor when the tractor engine is shut off. Solar panels are mentioned as one possible power source (see col. 6, line 3) although the primary power source appears to be the engine of a refrigeration unit on the trailer.

US patent application 2004/0231831 of Houck shows another auxiliary power supply to be added to a tractor.

US patent application 2007/0221370 of Allen shows an auxiliary power system for a tractor's HVAC unit comprising a second battery bank.

US patent application 2008/174174 of Burns et al shows a regeneration system for a trailer whereby energy can be captured on down-grades and under braking and used to power the trailer wheels for propulsion, or for other purposes.

US patent application 2009/0260377 of Miller et al shows a modularized HVAC system for a tractor.

US patent application 2010/0146821 of Kaesler et al shows a resistive heating element to be mounted on the inside of the roof of a trailer to prevent ice and snow buildup.

US patent application 2010/0212659 of Carpoff shows trailer-mounted solar panels to be used to provide power to construction sites and other locations to which the power grid does not extend.

US patent application 2010/0263703 of Reichart et al shows solar panels to be mounted to the roof of a trailer to power the air handling system thereof; batteries are provided to store energy during darkness.

Patent Cooperation Treaty application WO2009/89160 of Jordan is nearly incomprehensible, but appears to disclose an auxiliary power system for a tractor that provides several different output voltages.

Finally, Patent Cooperation Treaty application WO2010/94875 of Porcellato shows a system for controlling the charging of a battery.

It will be appreciated that many of the above references showing use of an auxiliary engine, e.g., that of a trailer refrigeration unit, to power truck loads during periods when the truck is stopped would also involve running an engine for long periods of time, which is also very undesirable. What is needed is a system for powering such loads, and others, that does not require running an engine to meet those load requirements. Such an auxiliary power system would be useful in keeping a truck cab comfortable for long stationary periods without running the engine. Such a system would be useful likewise for buses, emergency vehicles and the like, wherein the driver may be required to remain in the cab for lengthy periods, without idling the engine.

SUMMARY OF THE INVENTION

According to an important aspect of the invention, a truck trailer is provided with an auxiliary power system that is capable of collecting and storing solar energy and using this power to supply several needs. First, the trailer power system can provide either 12 VDC or 120 VAC power to a tractor to supply the tractor's heating and air conditioning ("HVAC") system, and related loads such as comfort loads, e.g., a television or computer, while the truck engine is shut off. Second, the stored power can be used to heat the roofs of the trailer and tractor to loosen the adhesion of snow and ice, so that they can be readily removed before the combination is moved. Optionally, the removal of snow and ice can be accomplished with an inflatable bladder on the top of the trailer and/or tractor, to break up and remove snow and ice. Third, the stored power can be used to heat or cool the interior of the trailer, when the characteristics of the load make this desirable. Fourth, the stored power can be used to light electroluminescent or other lighted signage on the sides of the trailer, or to power other trailer loads, such as lift gates, battery powered lift trucks, or emergency lighting.

Solar panels produce DC, and electrical power is best stored as DC in batteries or capacitors; AC is not readily stored. However, AC is required to power electroluminescent signage, if employed, may be preferred for operation of the truck's HVAC system, and may be preferred for other types of lighting or various trailer heating and cooling equipment. Therefore, the system comprises a DC-to-AC inverter for conversion of the DC produced by the solar panels and stored in batteries or capacitors to AC for these purposes. Solar panels are now produced with individual inverters, which are preferred over a single inverter for reasons of reliability. Accordingly, it would be desired to provide these individual inverters with controlled switches, so that when DC production is preferred, for storage, the inverters are disabled; when AC is needed, the individual inverters can be enabled. The stored power can also be supplied to the solar panels by way of a reverse-biased connection, to heat the solar panels directly, thus avoiding the use of separate resistance heating elements.

If inflatable bladders are employed to break up snow and ice, additional features within the invention include an air compressor to inflate the bladder(s), (although possibly the tractor's air compressor could be used for this purpose), and that the solar panels and roof heaters must be flexible or be mounted on the bladder so as to allow it to be inflated without damaging the solar panels. Possibly the roof heaters could be implemented by flowing hot water or another heat exchange liquid through channels formed in the bladder; heating liquid might be more energy-efficient than use of resistive heating elements on the bladder. Further, the liquid might be cooled in hot weather; cooling the roof of the trailer would be an efficient way to reduce heat build-up in the trailer, and might be an effective way to reduce refrigeration costs.

Further features of the invention are that DC produced by the tractor when the engine is running could be stored in the trailer's batteries or capacitors, and that a thermostat responsive to outside temperature could be provided to activate heaters on the roof of the trailer and tractor so as to eliminate the build-up of ice and snow.

It would be desirable to provide the trailer power supply according to the invention as an integrated unit that could be added as a retrofit to existing trailers, possibly with the components other than the solar panels and bladder in a temperature-controlled box mounted under the chassis of the trailer, so as not to lose trailer volume.

As noted above, many of the same concerns are applicable to buses, emergency vehicles and the like, and the auxiliary power system of the invention is useful with these as well.

BRIEF DESCRIPTION OF THE DRAWINGS

The invention will be better understood if reference is made to the accompanying drawings, in which:

FIG. 1 is a perspective schematic view of a truck and trailer assembly, having additional components according to the invention added thereto;

FIG. 2 is a cross-section along line A-A of FIG. 1; and

DETAILED DESCRIPTION OF THE PREFERRED EMBODIMENTS

Figure 3:
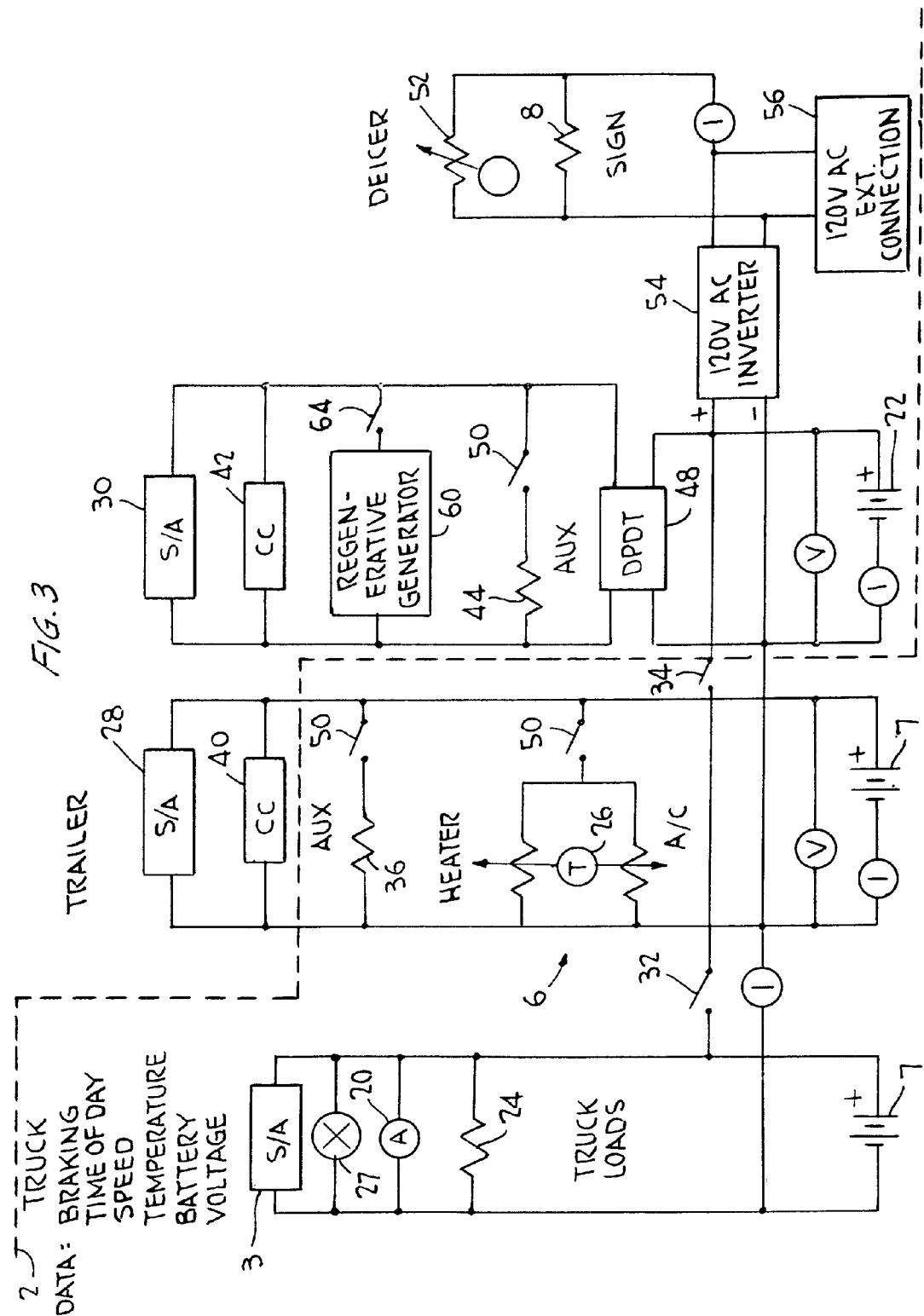
FIG. 3 is a schematic diagram, showing the principal electrical components in the system of the invention.

As mentioned, FIG. 1 is a perspective schematic view of a truck and trailer assembly, having additional components according to the invention added thereto, and FIG. 2 is a cross-section along line A-A thereof. Thus, FIG. 1 shows the combination of a trailer 1 and a truck (or "tractor") 2, which are generally conventional except as mentioned herein. Accordingly, truck 2 comprises an internal combustion engine that when operated drives an alternator 20 (FIG. 3) which charges one or more batteries 7 of the truck 2, and which according to the invention also charges a battery 22 (FIG. 3) carried on the trailer 1. ("Battery" as used herein is to be understood multiple batteries connected in one or more banks, and to include other forms of electrical energy storage, e.g., capacitors.)

Truck 2 also comprises an HVAC (heating, ventilation and air conditioning) system 6 which is powered by the truck's engine when running and can be powered by a variety of sources of electrical power when the engine is not running. For example, as mentioned modern trucks are commonly fitted with components allowing the HVAC system 6 to be operated by "shore power", i.e., by being plugged into electrical outlets provided for the purpose at truck stops. According to one aspect of the invention, as further detailed below, these components can instead be powered by an auxiliary battery 22 on the trailer 1 when such connections are not available. Likewise, additional truck loads 24, such as comfort loads (again, such things as a television or computer, or microwave oven) and the like, can be powered by either the truck's power supply, by shore power, or by the auxiliary power system of the invention. The invention is also useful with trucks not equipped for shore power per se, of course.

FIG. 3 shows a schematic diagram of the principal electrical components of the auxiliary power system according to the invention. Those on the truck 2 are demarcated from those on the trailer 1 by a dashed line. As noted above, the truck components include an alternator 20 and one or more batteries 7, as well as various comfort loads 24 and a conventional HVAC system 6, controlled by a thermostat 26. According to the invention, the truck may have added to its usual equipment additional charging components, such as a solar array 3 on its roof (FIG. 1) and a wind turbine 27 useful as a further power source. Both can assist in charging the truck batteries 7, as well as the auxiliary battery 22 carried by the trailer, as indicated by the electrical connections shown in FIG. 3.

As also shown by FIG. 3, trailer 1 also comprises one or more solar arrays 28 and 30. As shown in FIG. 3, array 28 is connected to charge at least one of the truck's batteries 7, with the other truck battery 7 also chargeable thereby by closing a switch 32; auxiliary battery 22 can also be charged by array 28 by closing a further switch 34. The same connections can be employed to allow array 28 to power the truck's HVAC system 6 as well as the comfort loads 24 and any auxiliary truck loads shown at 36.

Solar array 30 is arranged to charge auxiliary battery 22, and can also charge truck batteries 7 and power the various truck loads 6, 24, and 36 by closing switches 32 and 34. An auxiliary trailer load 44 (such as equipment for controlling the temperature in the trailer) is also connected to be powered alternatively by the solar array 30 or the auxiliary battery 22, and by appropriate operation of switches 32 and 34, by the truck's alternator or batteries 7.

The auxiliary power unit of the invention can also be used to power other loads, such as electric lift gates, battery-powered lift trucks, cranes and the like carried with the trailer, emergency lighting in an enclosed trailer, a location-transmitting unit for aid in recovering a lost or stolen trailer, and others.

The truck and/or trailer can also be fitted with axle-driven regenerative generators 60, activated, for example, when the driver brakes the truck and trailer; at these times the generators can be activated to convert the vehicle's kinetic energy into electrical power, thus recovering power and providing retarding force, thus reducing wear on the conventional mechanical brakes. For example, the generator 60 might comprise a constantly-rotating armature within a field coil connected to battery 22. The armature might be driven by a gear train, belt or the like from the rear axle of the trailer, as indicated at 62. When the driver brakes the truck, that is, causes an increase in hydraulic pressure in the brake lines of the truck and trailer, the field coil can be connected to battery 22 by a switch 64 operated responsive to hydraulic pressure, effecting regenerative braking.

Certain of the principal components of the auxiliary power system of the invention, primarily the batteries, can be carried in a box 19 mounted under the trailer chassis.

As will be apparent to those of skill in the art, various sensor and control elements may be provided to monitor and control flow of current, such as charge controllers 40, 42, connected across the solar arrays 28 and 30 to prevent overcharging of the batteries. A similar charge controller would be employed with respect to solar array 3 on the truck, if provided. The voltage and current in the system will also be monitored by voltage and current sensors, as exemplified in FIG. 3 by "V" and "I" respectively. Those of skill in the art will also recognize that the switches 32 and 34, and other switches 50 activating the various loads, can be directly controlled by the driver, or can be controlled in response to control signals, e.g., from an onboard computer monitoring, for example, a sensor 26 responsive to the cab temperature.

Thus, according to the aspects of the invention described thus far, each of the loads of truck and trailer can be powered in a variety of ways: by the truck alternator, the truck batteries, the solar arrays, or the auxiliary battery, all depending on the circumstances.

As mentioned above, it is also an object of the invention to provide deicing capability to the roof of the trailer 1 and/or truck 2. There are several aspects to doing so conveniently, including providing heating to the surface of the roofs of trailer and/or truck, and providing a device to dislodge the accumulated snow and ice so that it falls harmlessly off their roofs.

Referring to FIGS. 1 and 2, the roof of the trailer 1 (for example) can be heated by an electrical resistance element 52 incorporated into its roof and powered by the auxiliary battery. This will limit or prevent buildup of snow and ice, or, if snowfall is excessive, at minimum prevent it from freezing solidly to the roof of the trailer. Accumulated snow and ice can then be dislodged by inflating a bladder 10 affixed to the roof of the trailer 1. Compressed air for doing so may be provided by an air compressor added to the trailer's equipment according to the invention, or by an air compressor of the truck (neither shown).

The bladder 10 might be manufactured of rubber-impregnated canvas, as used to make such products as fire hose and the bladders of inflatable boats. The electrical resistance element 52 can be adhesively bonded to the outer surface of the bladder or integrated into the bladder material. If a bladder is not used, the resistance element 52 can be formed on the outer surface of the solar array, using a transparent conductive film such as indium-tin oxide, in common use for resistance heating of automotive windshields and the like. In a further alternative, a flexible, thin resistive film (which need not be transparent) can be bonded to the backside of the solar array substrate or to the trailer top and used to heat the array to prevent buildup of snow and ice. It will be appreciated that if solar arrays 28 are to be mounted on the outer surface of bladder 10 this must be accomplished in a manner permitting the bladder to be inflated, as noted. Flexible solar arrays are now available that may be amenable to this use.

It is also within the invention to heat the roof of either or both truck and trailer by reverse-biasing the solar arrays 3, 28, and 30, that is supplying power to the solar arrays; under such circumstances, the solar arrays are heated by their resistance to current flow in the opposite direction than during generation. This reverse-biasing can readily be accomplished by interposition of a DPDT switch, with well-known polarity-reversing connections (indicated schematically at 48) in the lines connecting solar arrays 3, 28, and 30 to the respective batteries or other power sources; for example, it might be necessary to run the truck's engine to obtain enough power to heat the solar arrays to a point above freezing, as needed in order to achieve deicing. Thus it is also within the invention to employ power from the truck's engine to heat the trailer roof, where, for example, poor weather conditions have prevented sufficient energy from the solar array from having been stored in the battery system. A DC-to-DC converter (not shown) may be required in order to convert power stored in battery 22 to a voltage high enough to effectively heat the solar arrays by reverse-biasing them; such DC-to-DC converters are well known.

As mentioned above, it is also within the scope of the invention to heat the surface of the trailer roof with hot water or another heat transfer fluid, such as propylene glycol liquid, heated in a heater powered by auxiliary battery 22, or likewise to cool it.

As mentioned above, it is also within the scope of the invention to employ the power stored in the auxiliary battery 22 to power lighted signage 8 on the flanks of the trailer 1. Electroluminescent signage is envisioned as one possible type of signage 8 to be employed. Such electroluminescent signage requires AC power for illumination. Accordingly an inverter 54 is provided to convert the DC stored in battery 22 to AC to power the signage 8.

Likewise, if the electrical resistance heating element 52 is to be operated on AC, it can be connected to the inverter 54, as shown by FIG. 3; otherwise the heating element 52 can be controllably connected to battery 22. Where convenient, a "shore power" connection 56 can be provided and employed to heat the trailer roof at a stop, and to charge batteries 7 and 22 via inverter 54 operated as a battery charger, as is readily accomplished.

It will be appreciated that according to the invention, a net fuel saving will be realized by use of solar power in lieu of diesel fuel for powering the various loads mentioned. If sufficient electrical energy can be stored in the trailer's batteries it may even be possible to sell it back to a local power utility via a shore power-type connection as at 56. Renewable Energy Credits other value recognition may thus be available. An interconnection to an external power system and controllable switching device responsive to the interconnection may be employed for harvesting such excess power.

Finally, while the auxiliary power system of the invention has been described in connection with a truck and trailer combination, it is also within the invention to employ the system in connection with other vehicles, e.g, buses or emergency vehicles, where the driver may be required to remain with the vehicle for lengthy periods of time without idling the engine. In a retrofit implementation, such components as the auxiliary batteries 22 and electrically driven HVAC components can be carried in a box 19 mounted under the chassis of the vehicle, and the solar panels and resistance heaters, if used, mounted on the roof thereof.

Provisional application Ser. No. 61/592,252 of Flath et al, filed Jan. 30, 2012, and entitled Configurable Solar Panel Busbar Interconnect discloses certain details of solar panels and resistance heating elements, and other features, that may be useful in practice of the present invention, and is incorporated herein by this reference.

While preferred embodiments of the invention have been disclosed herein, the invention is not to be limited thereby, but only by the following claims.

What is claimed is:

1. An auxiliary power system, for employment with a vehicle, said vehicle comprising an engine, a storage battery, and an engine-driven charging device for charging said storage battery, said vehicle further comprising an electrically-driven heating, ventilation and air conditioning (HVAC) system and/or one or more comfort loads; and said auxiliary power system comprising:

an auxiliary electrical power storage unit;

an auxiliary electrical generation device connected to said auxiliary electrical power storage unit for generating electrical power for storage in said auxiliary electrical power storage unit;

wherein said auxiliary electrical generation device comprises an array of solar panels mounted on the roof of said vehicle, and wherein said array of solar panels can be operated as a heating element by reverse-biasing said array of solar panels employing power from said auxiliary electrical power storage unit or said engine-driven charging device; and controllable switching devices for controlling flow of electrical energy between said auxiliary electrical generation device, said auxiliary electrical power storage unit, said array of solar panels, said electrically-driven heating, ventilation and air conditioning (HVAC) system and/or one or more comfort loads.

2. The auxiliary power system of claim 1, wherein said auxiliary electrical power storage unit comprises an auxiliary storage battery.

3. The auxiliary power system of claim 1, wherein said HVAC system is adapted to be driven by AC power, said auxiliary electrical power storage unit comprises an auxiliary storage battery for storing DC power, and said auxiliary power system further comprises an inverter for converting DC power stored in said auxiliary storage battery to AC for supply to said HVAC system.

4. The auxiliary power system of claim 1, further comprising a heating element mounted on the roof of said vehicle for heating the roof of said vehicle responsive to power from said auxiliary electrical power storage unit.

5. The auxiliary power system of claim 4, wherein said heating element mounted on the roof of said vehicle comprises an electrical resistance heater.

6. The auxiliary power system of claim 4, wherein said heating element mounted on the roof of said vehicle comprises an electrical resistance heater, and wherein said resistance heater is integrated with said array of solar panels.

7. The auxiliary power system of claim 5, further comprising an inflatable bladder adapted to be inflated to dislodge snow and ice from the roof of said vehicle.

8. The auxiliary power system of claim 7, wherein said electrical resistance heater and said array of solar panels are mounted on an outer surface of said bladder such that said bladder can be inflated without disturbance of the functions of said resistance heater and solar panels.

9. The auxiliary power system of claim 1, wherein said vehicle is a truck and trailer combination, and wherein said truck comprises said engine, storage battery, and engine-driven charging device for charging said storage battery, said truck further comprising said electrically-driven heating, ventilation and air conditioning (HVAC) system and/or one or more comfort loads; and wherein said trailer comprises:

said auxiliary electrical power storage unit;

said auxiliary electrical generation device connected to said auxiliary electrical power storage unit for generating electrical power for storage in said auxiliary electrical power storage unit, and said array of solar panels, said array of solar panels being mounted on the roof of said trailer; and said controllable switching devices for controlling flow of electrical energy between said auxiliary electrical generation device, said auxiliary electrical power storage unit, and said electrically-driven heating, ventilation and air condition (HVAC) system, said array of solar panels, and/or one or more comfort loads.

10. The auxiliary power system of claim 1 further comprising an interconnection to an external power system, at least one of the controllable switching devices responsive to the interconnection for harvesting excess power.

11. The auxiliary power system of claim 10 wherein the external power system is an electrical grid infrastructure and the interconnection is adapted to provide flow of power to the electrical grid infrastructure.

12. The auxiliary power system of claim 11 wherein the interconnection conforms to guidelines of regulatory authorities for value recognition of the power flow.

13. The auxiliary power system of claim 1 further comprising a generator driven by excess kinetic energy of said vehicle to provide further electrical power for storage in said auxiliary electrical power storage unit.

* * * * *